United States Patent [19]

Alfio

[11] 4,228,134
[45] Oct. 14, 1980

[54] AUTOCLAVE FOR THERMALLY TREATING VERY LONG RUBBERY HOSE PRODUCTS, AND THE LIKE

[75] Inventor: Deregibus Alfio, Padova, Italy

[73] Assignee: The Goodyear Tire & Rubber Company, Akron, Ohio

[21] Appl. No.: 841,788

[22] Filed: Oct. 13, 1977

[30] Foreign Application Priority Data

Apr. 5, 1977 [IT] Italy ............................... 23161 A/77

[51] Int. Cl.² ........................ B01J 3/04; A61L 3/00
[52] U.S. Cl. ................................... 422/208; 422/295; 422/296; 422/242; 422/307
[58] Field of Search ................... 23/290; 21/91-98; 34/104, 107; 220/232, 331, 345, 346, 347, 69; 126/20; 425/444, 445; 49/477, 340, 344

[56] References Cited

U.S. PATENT DOCUMENTS

| 151,419 | 5/1874 | Murphy | 21/92 |
|---|---|---|---|
| 1,308,563 | 7/1919 | Underwood | 21/95 |
| 2,525,662 | 10/1950 | Freeman | 23/290 X |
| 3,298,794 | 1/1967 | Mikesell et al. | 23/290 |
| 3,694,962 | 10/1972 | McDonald et al. | 220/232 |
| 3,768,203 | 10/1973 | Bellucci | 220/331 |
| 3,792,795 | 2/1974 | Sikora | 220/69 |

*Primary Examiner*—S. Leon Bashore
*Assistant Examiner*—Chris Konkol
*Attorney, Agent, or Firm*—William A. Drucker; R. S. Washburn

[57] ABSTRACT

An autoclave comprises a long upwardly open channel-shaped vessel, a gas and pressure resistant lid closing the vessel, means for actuating the lid for simultaneously closing and opening the autoclave along its entire length, the structure of the vessel being unitary and supported at a plurality of locations along its length for permitting heat promoted variations in length of the autoclave.

6 Claims, 5 Drawing Figures

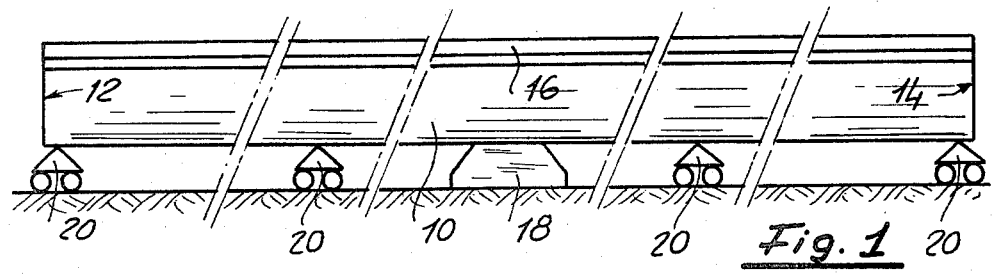
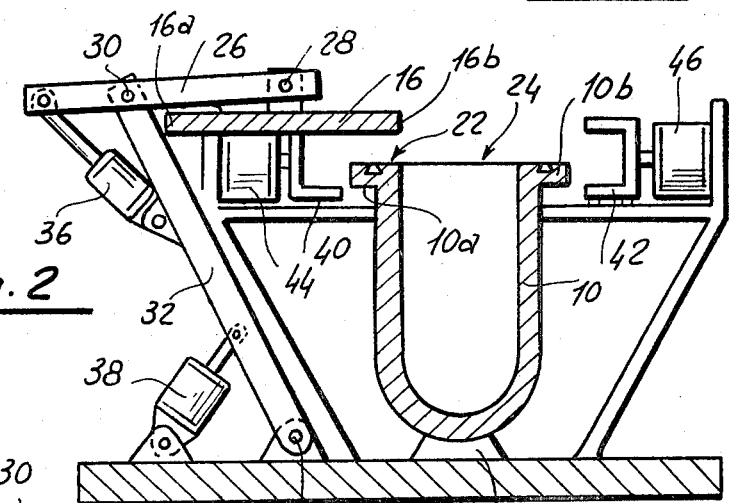
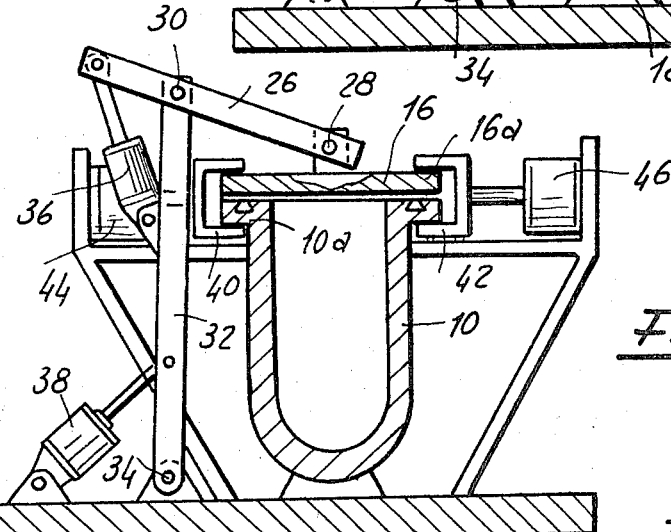
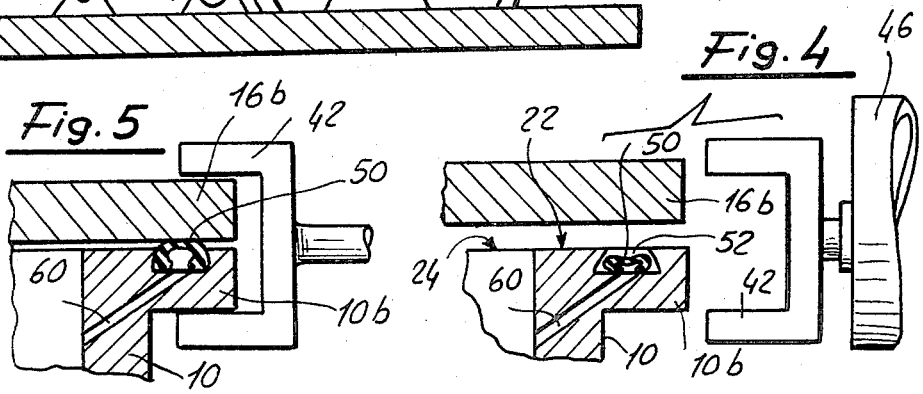

AUTOCLAVE FOR THERMALLY TREATING VERY LONG RUBBERY HOSE PRODUCTS, AND THE LIKE

BACKGROUND OF THE INVENTION

1. Field of the Invention

This invention concerns equipment, generically coming within the category of the so-called "autoclaves", for the thermal treatment, in closed and pressurized surroundings, and generally with steam, of products and articles of vulcanizable elastomeric material, such as natural or synthetic rubber. More particularly, this invention concerns an autoclave of very extensive size, in given direction, for the treatment of rubber articles of corresponding great length, typically rubber or essentially rubber hose, produced in pieces with a length generally greater than 100 meters.

More specifically, this invention concerns a linear autoclave for the industrial uses described, and adapted to constitute an operative element or unit of a complete plant for the manufacture of pieces of hose, of great length, in natural or synthetic rubber, such a plant being the subject of another contemporaneous application by the same applicant, to whose context reference is herein made, for the better understanding of some of the technical and industrial features of this same invention.

Moreover, the above mentioned use of this invention does not constitute a limitation of the use of the invention, in that the invention could find advantageous industrial uses in equivalent fields, for example for the formation of vulcanizable rubber tapes, destined to various uses, for example, for the winding and manufacture of shaped bodies with a non-uniform diameter, or other.

2. Description of the Prior Art

The construction and more particularly the use of autoclaves with a length which in practice has not been considered by the experts in the art until now, for the production and the treatment by vulcanization of substantially linear articles, of corresponding great length, provide the solution to technical problems and the observance of conditions which, although common to all autoclaves, are presented in a different way in the field of the industrial production considered by this invention.

In fact, the autoclaves destined to operate in said field must avoid drawbacks and limitations resulting from the inevitably large dimensional variations due to temperature variations, their internal space must be accessible along their entire great length, because linear articles of corresponding great length cannot be introduced and removed "heat first" into the autoclave; the closing of the autoclave must be air tight along its entire length, and the movable components and in particular the lid closing the internal space of the autoclave, must be practically uninterrupted and susceptible to contemporaneous operation along the entire length.

To these conditions must be added the characteristics of rapid and safe manoeuvrability for the introduction, treatment and removal of the articles to be vulcanized the whole so as not to endanger the autoclave complex, to assure the uniformity and regularity of the treatment at every point of the article, and to reduce to a minimum the times required for the handling and the operations necessarily occurring between the successive mechanization cycles, carried out in the autoclave itself.

SUMMARY OF THE INVENTION

With the aim of reaching these and other advantages, characteristics and possibilities of industrial production, the autoclave according to the invention, which in practice can be practically without limits in length, is essentially characterized by being made up of a rectilinear channel-shaped body, open along the top, provided with an essentially unitary lid, connected at a number of points distributed along the said length, to a corresponding number of means for mechanical support, raising, and reapplication of the lid itself, when opening the autoclave, said mechanical means being individually connected to operative means, in particular oleodynamic or pneumatic jacks, operating parallely or in synchronism, so as to make the said lid move equally at every point in order to obtain the opening and the closing of the autoclave.

Preferably, these means are connected to devices for locking the lid in the closed position, these devices being preferably but not necessarily operated unitarily and synchronously.

According to an advantageous complementary characteristic of the invention, the entire outline of the elongated opening of the body of the autoclave is connected to a strip or sealing means made up of a pipe of deformable material, into which a pneumatic pressure can be applied, causing swelling and the consequent tight adherence of the said strip to the opposite marginal areas of the said lid. According to a complementary characteristic of the invention, the inside of the said tubular strip or sealing means is connected to the inside of the autoclave space, in such a way that its swelling and therefore the activation of the airtight sealing system occurs directly after the application of steam under pressure into the autoclave itself.

These and other more specific characteristics of the invention will be evident from the following detailed description of a preferred but not exclusive embodiment, with reference to the drawings;

BRIEF DESCRIPTION OF THE DRAWINGS

FIG. 1 shows schematically in side view and cut away and foreshortened in the longitudinal direction, (for obvious reasons of size), an example of the linear autoclave;

FIG. 2 shows, on a larger scale and in greater detail (but with some simplifications in constructive details) the autoclave open, and seen in transverse section at any point of its working length;

FIG. 3 similarly shows the autoclave, in closed and locked condition, for the carrying out of the vulcanizing process of the article (not illustrated) arranged inside it;

FIGS. 4 and 5 show, similarly in cross section, details of the preferred means which assure the airtight sealing of the internal space of the autoclave, and obtained, according to the said complementary characteristic of the invention, by using the steam pressure introduced into the same autoclave.

DESCRIPTION OF THE PREFERRED EMBODIMENTS

With particular reference to the figures of the drawing: in its whole and as schematically illustrated in FIG. 1, the autoclave comprises a channel-shaped body, indicated as 10, which is a unitary structure, for example produced by means of assembly and connection on site, by means of welding, of a number of components. This body 10 is closed at both extremities by means of heads 12 and 14 (drawn as a simple line in FIG. 1 for the sake of simplicity, but obviously of any desired shape, for example round) but open at the top along its entire length. To this body a lid 16 is connected, also of a unitary structure, to close and seal the said opening.

Given the great length and essentially unitary structure of the said body 10, and the variations in temperature to which the autoclave is inevitably subjected, the said body 10 is supported at not more than one point, preferably in its central zone, by a suitable fixed support 18, whilst its weight is distributed equally, through its remaining parts, on a number of supports 20, schematically illustrated in FIG. 1 in the form of "trolleys", and constructed in such a way as to allow rectilinear movements of the said parts, resulting from the thermal expansion and contraction. The lid 16 is produced for example by means of a number of plates arranged side by side and welded and composed of a material, generally ferrous, possessing a coefficient of thermal expansion equal to that of the body 10, in such a way which the said lid, that heats and cools in the same way as the body, follows its dimensional variations.

The fact that the autoclave is composed of a channel-shaped body open along its entire length, permits the placing of the articles by transporting them in a direction transversal to the said length (for example, by means of a number of bridge cranes operating in synchronism) occupying together a quite limited space, and without having to use trolleys (which in this case would have to be of excessive length) as is used traditionally for the loading and unloading from one end, in the known autoclaves. The internal transversal dimension of the body 10, the same or different to that illustrated in FIGS. 2 and 3, is obviously of a size to receive the article or, preferably, a number of articles to be treated together, of a predetermined section and transversal volume, without leaving excessive spare space, for obvious reasons of saving on the inevitably considerable quantity of steam which must be introduced into the autoclave itself, in the course of treatment.

A critical condition for the use of an autoclave as described above, is that the lid 16 which has a unitary structure must be raised and moved, with times and movements at accordance, in a number of points distributed along its length. The opening and closing of the lid could be obtained by means of mechanisms of the type illustrated in FIGS. 2 and 3, or their equivalent. These mechanisms can include hinge systems for the raising of the lid to rotate around an axis parallel to one of the greater sides of the opening of the autoclave, and systems such as to assure that the said lid can be perfectly applied "flatwise" on to the surface 22 of the upper part of the said outline. The mechanical means which raise and reapply the said lid therefore comprise preferably joints or balanced suspension.

In the example shown, the lid 16 can be moved away from the opening 24 of the channel-shaped body by means of lever and brace systems as illustrated in FIGS. 2 and 3, which are reproduced and distributed along the length of the autoclave at suitable intervals. Each mechanism includes for example an upper lever 26, one end of which is fixed at 28 to the lid 16, preferably above its longitudinal barycentric line, as well as fixed at 30 to the head of a second carrying lever 32 fixed in its turn at 34 to a fixed point, which can however favour the thermal expansion of the lid 16, when it cannot be absorbed by the said levers and the said joints. The lid 16 therefore carries out a combined movement of raising and translation for the complete uncovering of the opening 24, a movement which can be seen from FIGS. 2 and 3.

The movements of the lever 26, for the raising of the lid, can be controlled by jacks 36, connected by means of suitable joints to the parts on which they act and react, and those of the carrying lever 32, which determine the lateral moving, by jacks 38, correspondingly connected by means of joints. The batteries of jacks 36 and 38 can be controlled in sequence, in order to obtain the desired sequence of movements, but all the jacks of each battery must be controlled in synchronism and phase, in order to obtain a movement of the lid 16, in its entirety, keeping parallel to itself.

Another critical condition is that the lid 16 can be restrained at a number of points, preferably relatively close, to the profile of the opening 24, in order to be able to resist the considerable thrust applied at the same time to the said lid, by the pressure of the steam introduced into the autoclave. This restraint can by obtained for example by means of a number of opposed brackets 40 and 42, connected along the profile of the said opening, and of a shape such as to bestride both the marginal parts 16a and 16b of the lid 16, as well as the protruding edge 10a and 10b of the body 10, after a previous application of the lid on to the opening 24. These brackets are operated for example in their turn by jacks 44 and 46, also operated in synchronism along the length of the autoclave, by control means connected to suitable safety systems, for example, in such a way that the brackets can be moved towards their working position only after the completion of the application of the lid, and respectively they are withdrawn after the inside of the autoclave is totally reduced to atmospheric pressure. Similarly, other safety devices could prevent the activation of the jacks 36 and 38 for the raising and opening of the lid, until this latter is completely freed from the restraint imposed by the said brackets.

According to another complementary characteristic of the invention, the airtight sealing between the applied lid and the profile of the opening 24 of the autoclave, is assured by means of pneumatically reinflatable strips. As illustrated in FIGS. 4 and 5, these strips are made up of an essentially channel shaped body 50 placed in a packing groove 52 which runs without interruption along this profile. Obviously, when laying the said strip 50, suitable care should be taken in order to assure its perfect and complete insertion and so as to be uninterrupted along its length.

A gas under pressure, preferably steam, is applied to this sealing strip, in order to take advantage of the availability of the pressurized steam, necessary for the service of the autoclave. The introduction of steam into the inside of the autoclave and the strip can be carried out by means of a double tube system, emerging to a number of points distributed along the length of the autoclave, in order to assure that uniformity of the pressure applied is rapidly reached. According to a particularly simple solution, the walls of the body 10 are provided with passages so as to form a number of pipes 60 (FIGS. 4 and 5) which connect the inside of the autoclave with the inside of the sealing strip 50, without excluding the possibility of an independent and preliminary application of pressure into the strip, to obtain the airtightness of the closing before the application of pressure into the autoclave.

Similarly, considering the great volume of steam to be introduced into the autoclave, and the great length of the latter, the autoclave is provided with a number of steam outlets, distributed along its length. These outlets can be synchronously operated by means of electrically-operable valves or other, controlled by a central command. Obviously, modifications can be made within the scope of the invention as defined in the appended claims.

I claim:

1. An autoclave, for the curing by heat and pressure treatment of rubber hose mounted on a core comprising:
   (i) a very elongated body of U-shaped transverse cross-section and defining a linear trough-shaped chamber which is horizontal and which opens at an upper face of the body and which is closed at each end of the body, said chamber being of such elongation as to receive the hose and core in linear condition without folding or doubling,
   (ii) a separate closure for sealing of the upper face opening of the chamber along the whole extent of said opening,
   (iii) a plurality of movable means disposed at intervals alongside said body for movement in a direction transverse to its length and vertically downward toward said open end,
   (iv) means suspending said closure from said movable means to lie in a horizontal plane,
   (v) first means for operating said movable means to selectively move the closure from a first location offset laterally from the body in a transverse direction toward said body and to a second location over the open end thereof and from said second location to said first location,
   (vi) and second means for selectively operating said movable means to move the closure downwardly from said second location to completely cover said open end and upwardly away from the open end to said second location.

2. An autoclave, as claimed in claim 1, further comprising a plurality of supports disposed at intervals along the length of the body and serving to support the body with respect to the ground, said supports having roller means permitting movement in the direction of elongation of the body, thereby to permit movement of the body due to thermal expansion and contraction.

3. An autoclave, as claimed in claim 1, having fluid-inflatable sealing means arranged at said upper face of said body for contacting said closure, when the closure is in closed position, for fluid-tight sealing of the closure to the body.

4. An autoclave, as claimed in claim 3, wherein said body has a recess along said upper face at each side of the opening of said chamber and across the ends of said body, and said sealing means is a deformable inflatable element disposed in said recess.

5. An autoclave, as claimed in claim 4, further comprising means for application of fluid at greater than atmospheric pressure to said inflatable element to inflate it into contact with said closure.

6. An autoclave, as claimed in claim 4, wherein said body include passage means providing communication between said chamber and said recess for introduction of fluid at greater than atmospheric pressure from said chamber into said inflatable element.

* * * * *